(12) United States Patent
Bleifuss

(10) Patent No.: US 9,994,283 B1
(45) Date of Patent: Jun. 12, 2018

(54) HUMAN-POWERED VEHICLE

(71) Applicant: Rodney L. Bleifuss, Grand Rapids, MN (US)

(72) Inventor: Rodney L. Bleifuss, Grand Rapids, MN (US)

(*) Notice: Subject to any disclaimer, the term of this patent is extended or adjusted under 35 U.S.C. 154(b) by 0 days. days.

(21) Appl. No.: 15/380,087

(22) Filed: Dec. 15, 2016

Related U.S. Application Data

(60) Provisional application No. 62/434,065, filed on Dec. 14, 2016.

(51) Int. Cl.
| | |
|---|---|
| *B62M 1/12* | (2006.01) |
| *B62M 1/14* | (2006.01) |
| *B62M 1/16* | (2006.01) |
| *B62M 1/28* | (2013.01) |
| *B62M 1/30* | (2013.01) |
| B62M 23/00 | (2006.01) |
| B62K 5/06 | (2006.01) |

(52) U.S. Cl.
CPC ........... *B62M 1/12* (2013.01); *B62M 1/16* (2013.01); *B62M 1/28* (2013.01); *B62M 1/30* (2013.01); *B62K 5/06* (2013.01); *B62M 23/00* (2013.01)

(58) Field of Classification Search
CPC . B62M 1/12; B62M 1/14; B62M 1/16; B62M 1/28; B62M 1/30; B62M 23/00; B62K 5/06

See application file for complete search history.

(56) References Cited

U.S. PATENT DOCUMENTS

| | | | |
|---|---|---|---|
| 25,550 A | 9/1859 | Underhill | |
| 294,753 A * | 3/1884 | Bown | B62M 1/12 |
| | | | 280/234 |
| 608,350 A | 8/1898 | Stockford | |
| 614,320 A | 11/1898 | Dennison | |
| 749,153 A | 1/1904 | Batchelor | |
| 838,228 A | 12/1906 | Williams | |
| 879,947 A | 2/1908 | Crecelius | |
| 1,405,660 A * | 2/1922 | Berglund | B62M 1/12 |
| | | | 280/232 |
| 1,503,832 A * | 8/1924 | Hubbard | B62M 1/14 |
| | | | 280/234 |
| 1,562,553 A * | 11/1925 | Hansen | B62M 1/30 |
| | | | 280/215 |
| 1,620,926 A | 3/1927 | Trullinger | |
| 2,117,886 A * | 5/1938 | Henderson | B62M 1/14 |
| | | | 74/128 |
| 2,198,717 A | 4/1940 | Bottos | |
| 2,198,942 A | 4/1940 | Leggitt | |

(Continued)

FOREIGN PATENT DOCUMENTS

| | | | | |
|---|---|---|---|---|
| FR | 2579162 A1 * | 9/1986 | | B62K 5/02 |
| WO | WO 2014-045161 A1 | 3/2014 | | |

*Primary Examiner* — Joseph M Rocca
*Assistant Examiner* — Maurice L Williams
(74) *Attorney, Agent, or Firm* — Mueting, Raasch & Gebhardt, P.A.

(57) ABSTRACT

A human-powered vehicle may include a frame and a drive member pivotally coupled to the frame. Pivotal reciprocal motion of the drive member in either direction may generate rotational motion to the wheels of the human-powered vehicle. The seat of the human-powered vehicle may be positioned such that an axis about which the drive member pivots is located below, or closer to the ground surface, than the seat.

35 Claims, 12 Drawing Sheets

(56) References Cited

U.S. PATENT DOCUMENTS

| | | | |
|---|---|---|---|
| 3,498,634 A | 3/1970 | Sheldon | |
| 3,760,905 A | 9/1973 | Dower | |
| 3,874,700 A | 4/1975 | Lohr et al. | |
| 3,895,825 A * | 7/1975 | Sink | B62M 1/12 |
| | | | 280/234 |
| 4,305,600 A | 12/1981 | Mendez | |
| 4,430,902 A | 2/1984 | McClure | |
| 4,437,677 A | 3/1984 | Ksayian | |
| 4,473,236 A * | 9/1984 | Stroud | B62M 1/30 |
| | | | 280/254 |
| 4,508,358 A | 4/1985 | Erel | |
| 4,560,181 A | 12/1985 | Herron | |
| 4,639,007 A | 1/1987 | Lawrence | |
| 4,700,962 A | 10/1987 | Salmon | |
| 4,702,486 A | 10/1987 | Tsuchie | |
| 4,811,964 A | 3/1989 | Horn | |
| 4,861,055 A | 8/1989 | Jones | |
| 4,886,287 A | 12/1989 | Krause, II et al. | |
| 4,925,200 A | 5/1990 | Jones | |
| 4,928,986 A | 5/1990 | Carpenter | |
| 5,209,506 A | 5/1993 | Klopfenstein | |
| 5,272,928 A | 12/1993 | Young | |
| 5,280,936 A | 1/1994 | Schmidlin | |
| 5,284,355 A * | 2/1994 | Ishii | B62K 5/05 |
| | | | 280/265 |
| 5,536,029 A | 7/1996 | Gramckow | |
| 5,653,663 A | 8/1997 | McCahon | |
| 5,713,590 A | 2/1998 | Clark | |
| 5,775,708 A | 7/1998 | Heath | |
| 5,829,772 A | 11/1998 | Jones | |
| 5,865,455 A | 2/1999 | Taylor | |
| 5,876,052 A | 3/1999 | Olson et al. | |
| 6,086,078 A | 7/2000 | Ferez | |
| 6,224,078 B1 | 5/2001 | Tidcomb | |
| 6,234,504 B1 | 5/2001 | Taylor | |
| 6,764,089 B2 | 7/2004 | Drymalski | |
| 6,932,370 B2 | 8/2005 | Jones et al. | |
| 7,891,686 B1 | 2/2011 | Crawford | |
| 8,746,720 B2 | 6/2014 | Liao et al. | |
| 9,428,244 B2 * | 8/2016 | Sobolewski | B62M 1/16 |
| 2005/0087952 A1 * | 4/2005 | Drymalski | B62K 3/005 |
| | | | 280/244 |
| 2011/0248466 A1 | 10/2011 | Leslie | |
| 2011/0309596 A1 * | 12/2011 | Holmes | B62K 3/005 |
| | | | 280/246 |
| 2012/0187649 A1 * | 7/2012 | Bayne | B62K 5/025 |
| | | | 280/242.1 |
| 2014/0260725 A1 | 9/2014 | Weber | |

\* cited by examiner

HUMAN-POWERED VEHICLE

This application claims the benefit of U.S. Provisional Patent Application Ser. No. 62/434,065 filed 14 Dec. 2016, entitled "HUMAN-POWERED VEHICLE," which is incorporated herein by reference in its entirety.

The disclosure herein generally relates to human-powered vehicles and apparatus thereof and, specifically, human-powered vehicles configured to be driven, or powered, by reciprocal motion.

Human-powered vehicles have been made that attempt to independently combine arm and leg power, which may be an advantage for transportation purposes and may also produce better overall exercise than is possible with traditional pedal-crank bicycles. Further, it may be described that a rowing motion is a natural form for coordinating arm and leg power. Many previous attempts to independently combine arm and leg power have been awkward and inefficient due to weight and complexity or poor conservation of kinetic energy. Further, many previous attempts have also been hindered by poor impedance matching between the user and vehicle due to poor optimum leverage, stroke amplitude, or gearing.

Additionally, many previous attempts only provide power to the wheels in response to a single direction of motion input to a drive member. More specifically, many previous human-powered vehicles only allow a user to provide power, or motion, to the wheels of the vehicle on the "pull" stroke as opposed to both the "pull" stroke and "push" stroke. Further, many previous attempts at human-power vehicles that combine arm and leg power have poor ergonomics. For example, some human-power vehicles configure a seat relatively close to the ground surface to position a user's buttocks below a pivot point of a drive member used to provide power to the human-powered vehicle.

SUMMARY

The exemplary human-powered vehicle systems and apparatus described herein may be described as providing a new and unique way to harness reciprocal motion from a user into rotational motion used to one or more wheels in contact with a ground surface. The exemplary human-powered vehicle systems and apparatus may be further described as providing low complexity and high durability and as providing proper and efficient ergonomics.

An exemplary human-powered vehicle may include a frame extending from a forward end region to a rear end region. One or more front wheels may be coupled to the forward end region, and one or more rear wheels may be coupled to the rear end region. A seat may be located between the forward end region and the rear end region of the frame, and a drive member may be located between the seat and the forward end region. The drive member may be pivotably coupled to the frame such that reciprocal motion about a pivot axis, where the drive member is coupled to the frame, will provide power to, or drive, one or more wheels to move the human-powered vehicle forward along a ground surface. The drive member may be configured to be interacted with by a user's hands/arms and feet/legs, each of which provide force to the drive member for the reciprocal motion. Further, the pivot axis may be located closer to the ground surface than the seat to, for example, properly position a human user such that the user's feet are located below their buttocks to interact with the drive member.

One exemplary human-powered vehicle for traversing a ground surface may include a frame extending from a forward end region to a rear end region along a frame axis, at least one front wheel rotatably coupled to the forward end region of the frame member to roll over the ground surface and to support the frame member above the ground surface, at least one rear wheel rotatably coupled to the rear end region of the frame member to roll over the ground surface and to support the frame member above the ground surface, a seat coupled to the frame portion to receive a human's posterior, and a drive member extending from a hands end region to be engaged by the human's hands to a feet end region to be engaged by the human's feet. The drive member may be pivotably coupled to the frame member between the forward end region and the seat about a drive member axis perpendicular to the frame axis. The drive member may be operably coupled to the at least one rear wheel to rotate the at least one rear wheel in response to reciprocal motion of the drive member about the drive member axis in both clockwise and counterclockwise directions. The drive member axis may be located closer to the ground surface than the seat.

One exemplary human-powered vehicle for traversing a ground surface may include a frame extending from a forward end region to a rear end region along a frame axis, at least one front wheel rotatably coupled to the forward end region of the frame member to roll over the ground surface and to support the frame member above the ground surface, at least one rear wheel rotatably coupled to the rear end region of the frame member to roll over the ground surface and to support the frame member above the ground surface, and a drive member extending from a hands end region to be engaged by the human's hands to a feet end region to be engaged by the human's feet. The drive member may be pivotably coupled to the frame member between the forward end region and the rear end region about a drive member axis perpendicular to the frame axis. The drive member may be operably coupled to the at least one rear wheel to rotate the at least one rear wheel in response to reciprocal motion of the drive member about the drive member axis in both clockwise and counterclockwise directions. The exemplary human-powered vehicle may further include a transmission to operably couple the drive member to the at least one rear wheel. The transmission may include at least one drive gear operably coupled to the at one rear wheel to rotate to the at one rear wheel in response to the at least one drive gear being rotated, a first gear operably coupled to the at least one drive gear when the hands end region of the drive member is moved about the drive member axis towards the rear end region of the frame member, and a second gear operably coupled to the at least one drive gear when the hands end region of the drive member is moved about the drive member axis towards the forward end region of the frame member.

In one or more embodiments, the human-powered vehicle may further include a handle member extending from a left end region to a right end region pivotably coupled to the hands end region of the drive member about a steering axis. The handle member may be operably coupled to the at least one front wheel to steer the human-powered vehicle, and may be configured to be engaged by the human's hands to be pivotable by the human about the steering axis to steer the human-powered vehicle and to reciprocally move the drive member about the drive member axis to drive the rotation of the at least one rear wheel. Further, in one or more embodiments, the at least one front wheel may be operably coupled to the handle member via one or more cables to pivot the at least one front wheel about a turning axis substantially perpendicular to the ground surface.

In one or more embodiments, the human-powered vehicle may further include a transmission (e.g., positioned proximate the drive member axis) including at least one drive gear operably coupled to the at least one rear wheel to rotate to the at one rear wheel in response to the at least one drive gear being rotated, a first gear operably coupled to the at least one drive gear when the hands end region of the drive member is moved about the drive member axis towards the rear end region of the frame member, and a second gear operably coupled to the at least one drive gear when the hands end region of the drive member is moved about the drive member axis towards the forward end region of the frame member. Further, in one or more embodiments, the transmission may further include a chain operably coupling the at least one drive gear to the at least one rear wheel. Still further, in one or more embodiments, the transmission may further include a reversing gear operably coupling the second gear to the at least one drive gear when the hands end region of the drive member is moved about the drive member axis towards the forward end region of the frame member to rotate the at least one drive gear in the same direction as rotated by the first gear when the hands end region of the drive member is moved about the drive member axis towards the rear end region of the frame member. Yet still further, in one or more embodiments, the transmission may further include a drive axle fixedly coupled to the drive member and rotatably coupling the drive member to the frame member about the drive member axis where the first and second gears may be rotatably coupled to the drive axle, a first locking cam to engage the first gear to fixedly couple the first gear to the drive axle when the hands end region of the drive member is moved about the drive member axis towards the rear end region of the frame member and to disengage from the first gear to release the first gear from the drive axle when the hands end region of the drive member is moved about the drive member axis towards the forward end region of the frame member, and a second locking cam to engage the second gear to fixedly couple the second gear to the drive axle when the hands end region of the drive member is moved about the drive member axis towards the forward end region of the frame member and to disengage from the second gear to release the second gear from the drive axle when the hands end region of the drive member is moved about the drive member axis towards the rear end region of the frame member. And still further, in one or more embodiments, the transmission may further include an intermediate member pivotably coupled to the drive member about a pivot axis and fixed coupled to each of the first and second locking cams to pivot about the pivot axis to engage and disengage the first and second locking cams to and from the first and second gears, respectively.

In one or more embodiments, the at least one front wheel is a single front wheel and/or the at least rear front wheel is two rear wheels. Further, in one or more embodiments, the human-powered vehicle may include a feet member extending from a left end region to a right end region fixed coupled to the foot end region of the drive member to be engaged by the human's feet to reciprocally move the drive member about the drive member axis. Still further, in one or more embodiments, the feet end region may be positioned closer to the ground surface than the seat throughout the reciprocal motion of the drive member.

The above summary of the present disclosure is not intended to describe each embodiment or every implementation thereof. Advantages, together with a more complete understanding of the present disclosure, will become apparent and appreciated by referring to the following detailed description and claims taken in conjunction with the accompanying drawings.

DETAILED DESCRIPT OF EXEMPLARY EMBODIMENTS

Exemplary apparatus and systems related to a human-powered vehicle shall be described with reference to FIGS. 1-12. It will be apparent to one skilled in the art that elements or processes from one embodiment may be used in combination with elements or processes of the other embodiments, and that the possible embodiments of such apparatus and systems using combinations of features set forth herein is not limited to the specific embodiments shown in the Figures and/or described herein. Further, it will be recognized that the embodiments described herein may include many elements that are not necessarily shown to scale. Still further, it will be recognized that the size and shape of various elements herein may be modified but still fall within the scope of the present disclosure, although one or more shapes and/or sizes, or types of elements, may be advantageous over others.

Figure 1:
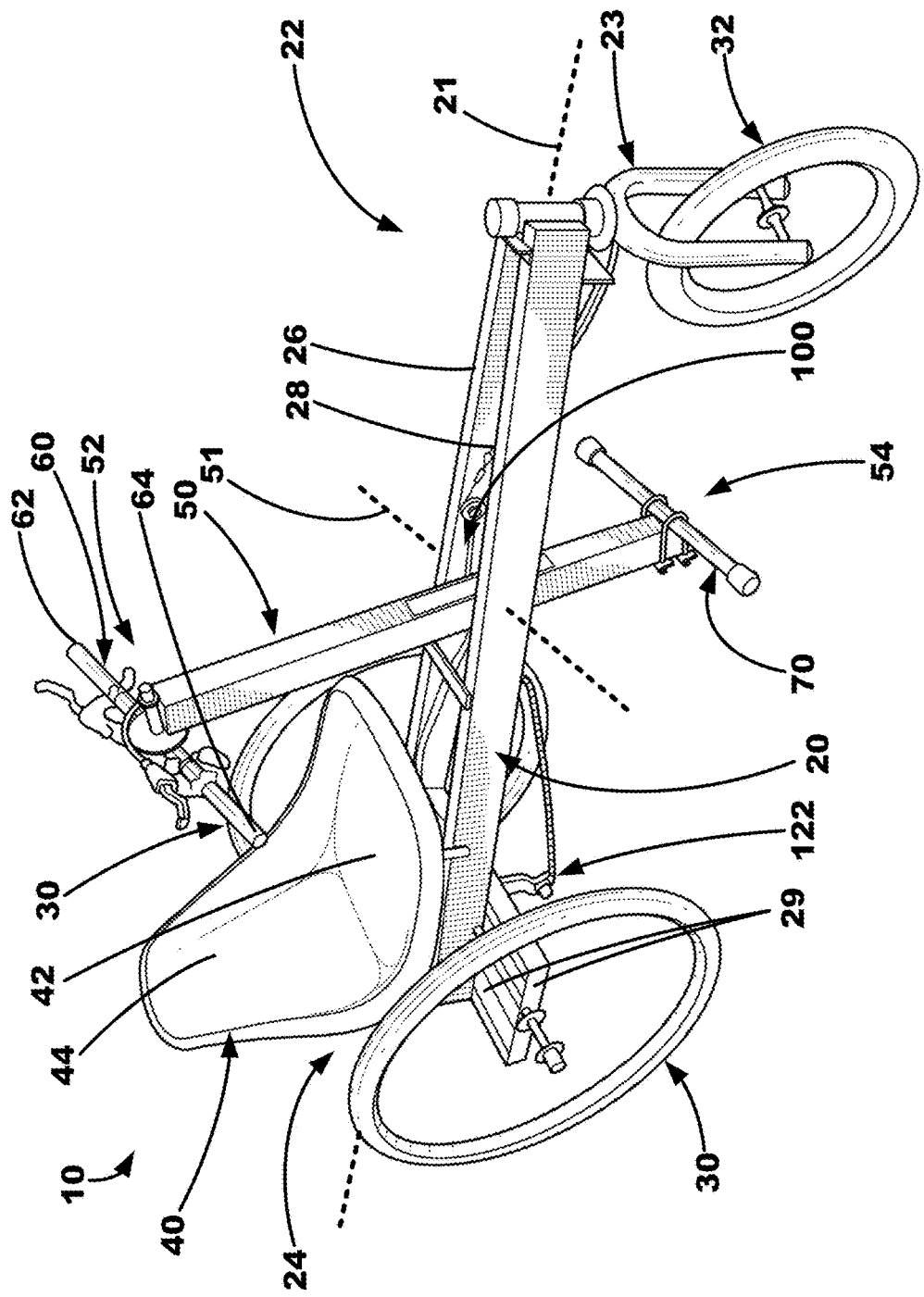
FIG. 1 is a perspective view of an exemplary human-powered vehicle.

An exemplary human-powered vehicle 10 depicted in FIG. 1 may be configured for traversing a ground surface 11 and may include a frame 20 from which one or more additional portions of the human-powered vehicle 10 may be coupled. The frame 20 may be described as being the "backbone" or central structural member of the human-powered vehicle 10 so as to provide structural support to the one or more additional portions of the human-powered vehicle 10. The frame 20 may extend from a forward end region 22 to a rear end region 24 along a frame axis 21. The frame 20 may include one or more frame elements that may be coupled together (e.g., via fasteners, welding, adhesives, etc.). For example, the frame 20 of the exemplary human-powered vehicle 10 of FIG. 1 may include a left frame element 26 and a right frame element 28, each of which extend from the forward end region 22 to the rear end region 24, and a plurality of rear frame elements 29 located proximate the rear end region 24 of the frame 20. The left frame element 26, the right frame element 28, and the plurality of rear frame elements 29 may be fixedly coupled together to define a rigid, or resilient, structure for the human-powered vehicle 10. The frame 20 and elements thereof may include (e.g., be formed of) one or more materials such as, e.g., steel, aluminum, titanium, carbon fiber, fiberglass, and/or polymer material. In the embodiment depicted in FIG. 1, the frame elements 26, 28, 29 are aluminum and fixedly coupled together using steel fasteners.

The human-powered vehicle 10 further includes a plurality of wheels for engaging a ground surface 11 and position the frame 20 above the ground surface 11. In the embodiments depicted herein, the human-powered vehicle 10 includes three wheels. It is to be understood that this disclosure contemplates human-powered vehicles that include less than three wheels such as, e.g., two wheels, and human-powered vehicles that include more than three wheels such as, e.g., four wheels.

More specifically, in this embodiment, the human-powered vehicle 10 includes two, or a pair, of rear wheels 30 that are rotatably coupled to the frame 20 proximate, or about, the rear end region 24 of the frame 20. One or both of the rear wheels 30 may be operably coupled to an exemplary transmission and drive member so as to be powered, or driven, by a user as will be further described herein. Further, the human-powered vehicle 10 includes a single front wheel 32 that is rotatably coupled to a fork element 23 to pivot on a vertical axis substantially perpendicular to the ground surface 11 and/or frame axis 21. The fork element 23 may be pivotably coupled to the frame 20 proximate, or about, the forward end region 22 of the frame 20 to provide steering or turning of the human-powered vehicle 10, which will be described further herein with respect to the steering apparatus. Thus, the human-powered vehicle 10 may include a front wheel 32 rotatably coupled to the forward end region 22 of the frame 20 configured to roll over a ground surface 11 and to support the frame 20 above the ground surface 11, and two rear wheels rotatably 30 coupled to the rear end region 24 of the frame configured to roll over a ground surface 11 and to support the frame 20 above the ground surface 11.

The exemplary human-powered vehicle 10 may further include a seat 40 coupled to the frame 20 to receive a human user (e.g., for a human user to sit on while riding or powering the human-powered vehicle 10). As shown, the seat 40 is coupled proximate the rear end region 24 of the frame 20. In other embodiments, the seat 40 may be coupled to the frame 20 in other locations so as to provide the functionality described herein. The seat 40 may include a bottom portion 42 to receive a human user's posterior, or buttocks, that is configured to be substantially parallel to the ground surface 11 upon which the human-powered vehicle 10 is located and a back portion 44 to receive, or contact, a human user's back or posterior torso region. The back portion 44 may extend substantially vertically from the bottom portion 42. The seat 40 may include (e.g., be formed of) one or more materials such as, e.g., steel, aluminum, titanium, carbon fiber, fiberglass, polymer material, leather, artificial leather, and/or canvas webbing. In the embodiment depict, the seat 40 may include plastic material. Further, canvas webbing may be used to provide comfortable support to the rider.

Further, the bottom portion 42 and the back portion 44 of the seat 40 may be described as being integral or one-continuous piece (e.g., molded as a single portion). In other embodiments, the seat 40 may include more than a single piece or portion. For example, the bottom portion 42 and the back portion 44 may be separate and adjustable with respect to each other to, e.g., facilitate users of various size. For instance, the seat 40 or portions thereof may be movable alone the frame 20 towards the rear end region 24 or the forward end region 22 and/or may be movable in a vertical direction away from the ground surface 11 or towards the ground surface 11. In other words, although the seat 40 as shown may not be adjustable, the seat 40 and portions thereof may be adjustable substantially horizontally and vertically. Further, in one or embodiments, the seat 40 may be pivotable along a vertical axis to, e.g., facilitate boarding.

Figure 2:
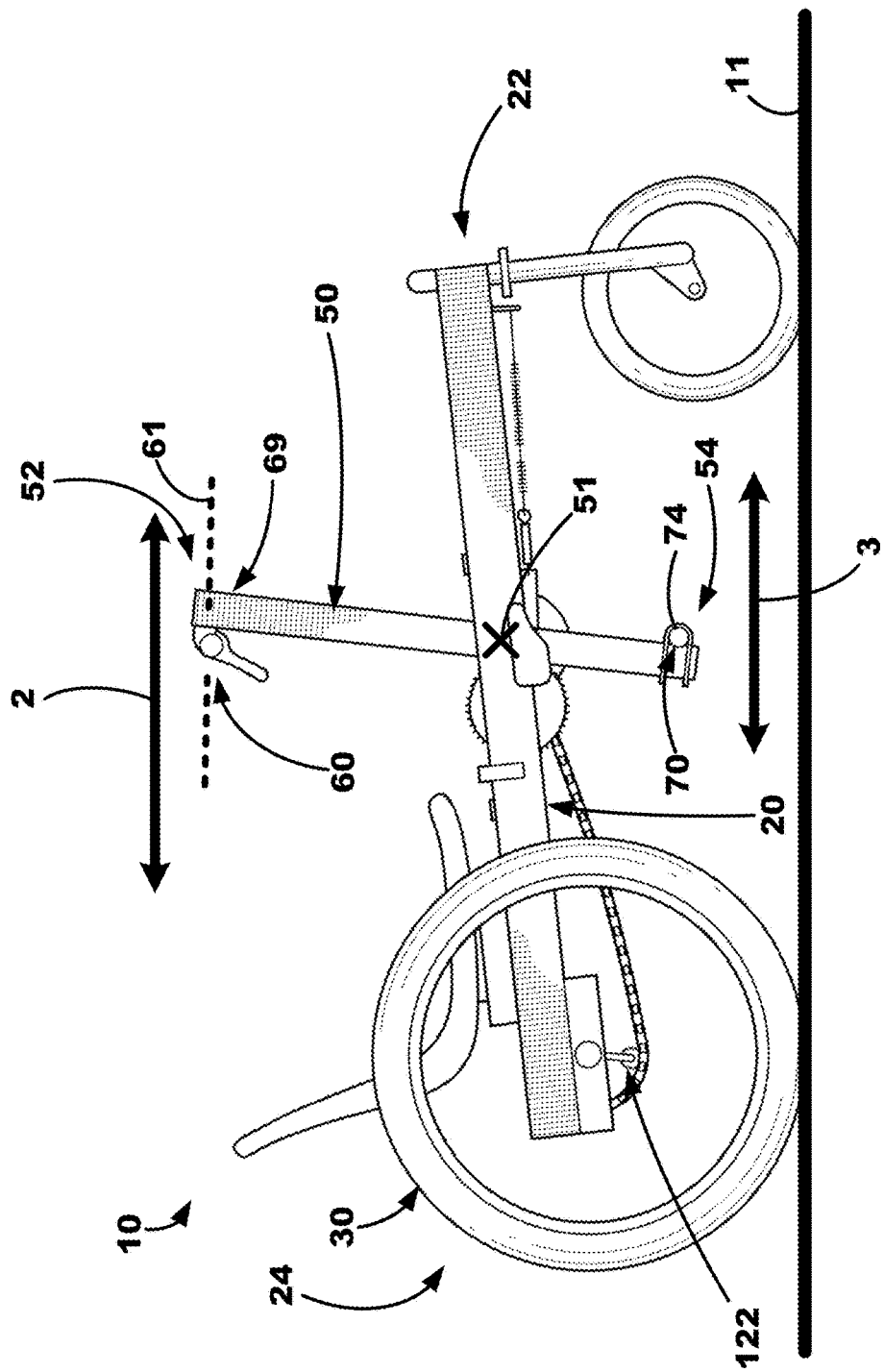
FIG. 2 is a side view of the human-powered vehicle of FIG. 1.
Figure 3:
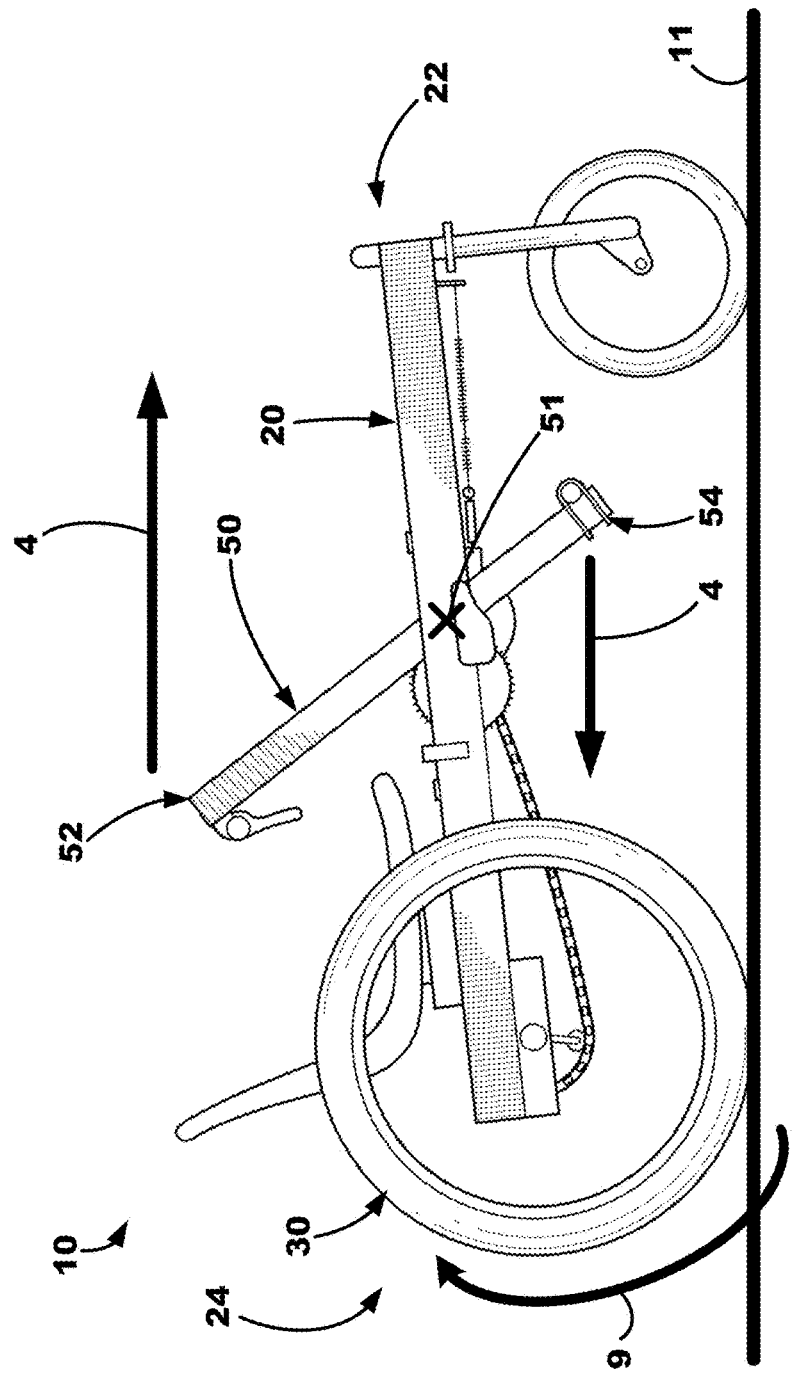
FIG. 3 is a side view of the human-powered vehicle of FIG. 1 at the end of a "power stroke."
Figure 4:
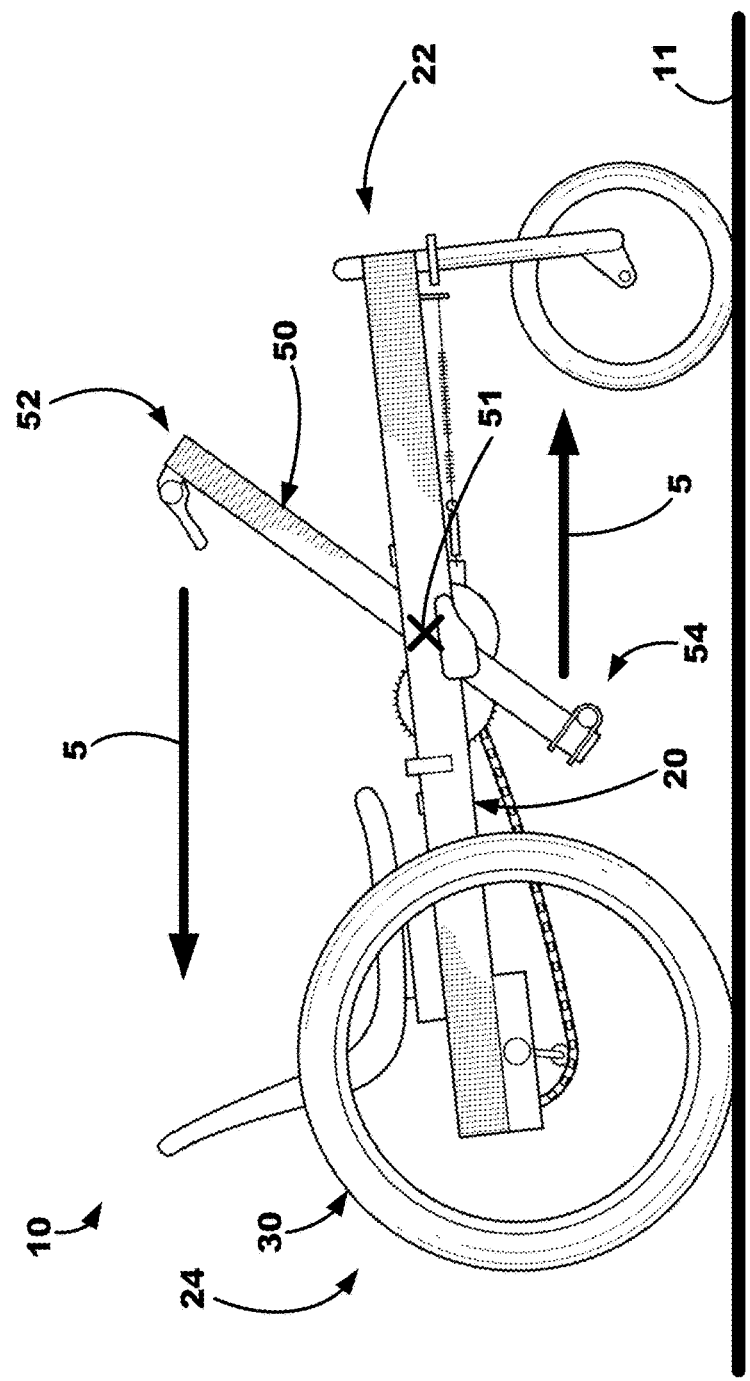
FIG. 4 is a side view of the human-powered vehicle of FIG. 1 at the end of a "recovery stroke."

The exemplary human-powered vehicles 10 described herein may be powered by reciprocal, or oscillating, motion generated by a human user. For example, a user seated in the seat 40 of the exemplary human-powered vehicle 10 may power the human-powered vehicle 1 through reciprocal motion 2, 3 as depicted in FIGS. 2-4. Specifically, a user may at least push-and-pull a portion of the human-powered vehicle 10 with their hands and arms and may push a portion of the human-powered vehicle 10 with their feet to generate rotational movement of one or more of the wheels 30 of the human-powered vehicle. To provide such functionality, the exemplary human-powered vehicle 10 may include a drive member 50 extending from a hands end region 52 to a feet end region 54. The hands end region 52 may be configured to be engaged by the user's hands (e.g., grasped, grabbed, pulled, pushed, etc.) and the feet end region 54 may be configured to be engaged by the user's feet (e.g., pushed, pulled if feet were attached to the feet end region 54, etc.).

The exemplary human-powered vehicle 10 may further include a handle 60 coupled to the hands end region 52 of the drive member 50 configured to be grasped, or grabbed, by a user's hands. The handle 60 may extend from a left end 62 located on the left side of the human-powered vehicle 10 to a right end 64 located on the right side of the human-powered vehicle 10. Although in this embodiment, the handle 60 is straight (e.g., extends along an axis), it is to be understood that the handle 60 may define any shape and/or size so as to be configured to be grasped by a user to provide "push," "pull," and "steering" functionality as described herein.

The exemplary human-powered vehicle 10 may further include a feet member 70 coupled to the feet end region 54 of the drive member 50 configured to be engaged by a user's feet. The feet member 70 may extend from a left end 72 located on the left side of the human-powered vehicle 10 to a right end 74 located on the right side of the human-powered vehicle 10. Although in this embodiment, the feet member 70 is straight (e.g., extends along an axis), it is to be understood that the feet member 70 may define any shape and/or size so as to be configured to be engaged by a user to provide "push" functionality as described herein. In one or more embodiments, a user's feet may be removably couplable to the feet member 70 (e.g., through "clip-less" pedal technology, straps, or clips) to provide "pull" functionality as described herein.

The drive member 50 may be pivotably coupled to the frame 20 between the forward end region 22 and the rear end region 24 about a drive member axis 51 (as shown in FIGS.

1-5) perpendicular to the frame axis 21. As will be described in more detail herein, the drive member 50 may be operably coupled to one or both of the rear wheels 30 to rotate one or both of the rear wheels 30 in response to reciprocal motion of the drive member 50 about the drive member axis 51 in both clockwise and counterclockwise directions. Further, as shown, the drive member axis 51 may be located closer to the ground surface 11 than the seat 40 (e.g., the bottom portion 42 of the seat 40). Still further, the feet end region 54 may remain closer to the ground surface 11 than the seat 40 during the reciprocal motion of the drive member 50.

A human user may engage the hands end region 52 of the drive member 50 using the handle 60 and the feet end region 54 of the drive member 50 using the feet member 70 with their hands and feet, respectively. The double-sided arrow 2 proximate the hands end region 52 of the drive member 50 represents the reciprocal motion that a user may provide to the hands end region 52, and the double-sided arrow 3 proximate the feet end region 54 of the drive member 50 represents the reciprocal motion that a user may provide to the feet end region 54 as shown in FIG. 2. In FIG. 3, a "power stroke" has been performed where the hands end region 52 of the drive member 50 have been moved generally towards the rear end region 24 of the frame 20 while the feet end region 54 of the drive member 50 have been moved generally towards the forward end region 22 of the frame 20. During a "power stroke" both of a user's hands/arms and feet/legs may be able to provide movement to the drive member 50.

When the hands end region 52 of the drive member 50 is moved generally towards the forward end region 22 of the frame 20, such movement may be referred to as the "recovery stroke" (e.g., even though the stroke still provides power to the wheels 30). The end of a "recovery stroke" is depicted in FIG. 4. The hands end region 52 has been moved towards the forward end region 22 of the frame 20 and the feet end region 54 of the drive member 50 has been moved towards the rear end region 24 of the frame 20. Such reciprocal motion provides drives rotational movement to one or both of the rear wheels 30 as indicated by the arrow 9 proximate the rear wheel 30 as labeled in FIG. 3.

In the "recovery stroke," a user may not engage the feet end region 54 of the drive member 50 with their feet to pull the feet end region 54 of the drive member 50 generally towards the rear end region 24 of the frame 20. Instead, a user may merely rest their feet on the feet member 70 proximate the feet end region 54 of the drive member 50 during the "recovery stroke." In other embodiments, a user's feet may be removable coupled to the feet member 70 proximate the feet end region 54 of the drive member 50 so as to be able to be pulled back towards the rear end region 24 of the frame 20 during the "recovery" stroke.

In other words, a "power" stroke has been finished, or completed, in FIG. 3 with the hands end region 52 of the drive member 50 located rearward towards the rear end region 24 of the frame 20 and the feet end region 54 located forward towards the forward end region 22 of the frame 20. Next, a "recovery" stroke may be performed as indicated by the arrows would be the next motion where the hands end region 52 of the drive member 50 is pushed forward towards the forward end region 22 of the frame 20 and the feet end region 54 is moved rearward towards the rear end region 24 of the frame 20. Conversely, a "recovery" stroke has been finished, or completed, in FIG. 4 with the hands end region 52 of the drive member 50 located forward towards the forward end region 22 of the frame 20 and the feet end region 54 located rearward towards the rear end region 24 of the frame 20. Next, a "power" stroke may be performed as indicated by the arrows 5 would be the next motion where the hands end region 52 of the drive member 50 is pulled rearward towards the rear end region 24 of the frame 20 and the feet end region 54 is moved forward towards the forward end region 22 of the frame 20. Such motion, like the motion shown in FIGS. 2-4, provides drives rotational movement (e.g., forward rotational motion) to at least one of the rear wheels 30 as indicated by the arrow 9 in FIG. 3.

The drive member 50 is pivotably coupled to the frame 20 proximate a central region 25 of the human-powered vehicle 10. The drive member 50 may be pivotably coupled to the frame 20 about a drive member axis 51 such that the drive member 50 may be moved "back-and-forth," or pivoted, about the drive member axis 51 when being "pushed" and "pulled" by a user engaging the hands end region 52 and the feet end region 54 of the drive member 50. The drive member 50 may extend through the frame 20 between the left frame element 26 and the right frame element 28 and be located proximate a central region 25 between the forward end region 22 and the rear end region 24 of the frame 20. Further, it may be described that the drive member 50 is pivotably coupled to the frame 20 between where the seat 40 is coupled the frame 20 and the forward end region 22 of the frame 20.

The drive member 50 may define a length between the hands end region 52 and the feet end region 54. As shown, the drive member 50 may be pivotally coupled to the frame 20 closer to the feet end region 54 than the hands end region 52. More specifically, the drive member 50 may be pivotally coupled to the frame 20 between a mid-point of the length of the drive member 50 and the feet end region 54, and may be closer to the mid-point than the feet end region 54.

The human-powered vehicle 10 may further include a transmission 100 that operably couples the drive member 50 to one or more of the rear wheels 30 to, e.g., translate pivotal, reciprocating motion of the drive member 50 to rotational motion of at least one of the rear wheels 30. In this embodiment, the transmission 100 may be located proximate the drive member axis 51 between the left frame element 26 and the right frame element 28. The transmission 100 may be located between the forward end region 22 and the rear end region 24 of the frame 20. Further, it may be described that the transmission 100 is located between where the seat 40 is coupled the frame 20 and the forward end region 22 of the frame 20. The transmission 100 will be further described herein with respect to FIGS. 5-12.

Figure 5:
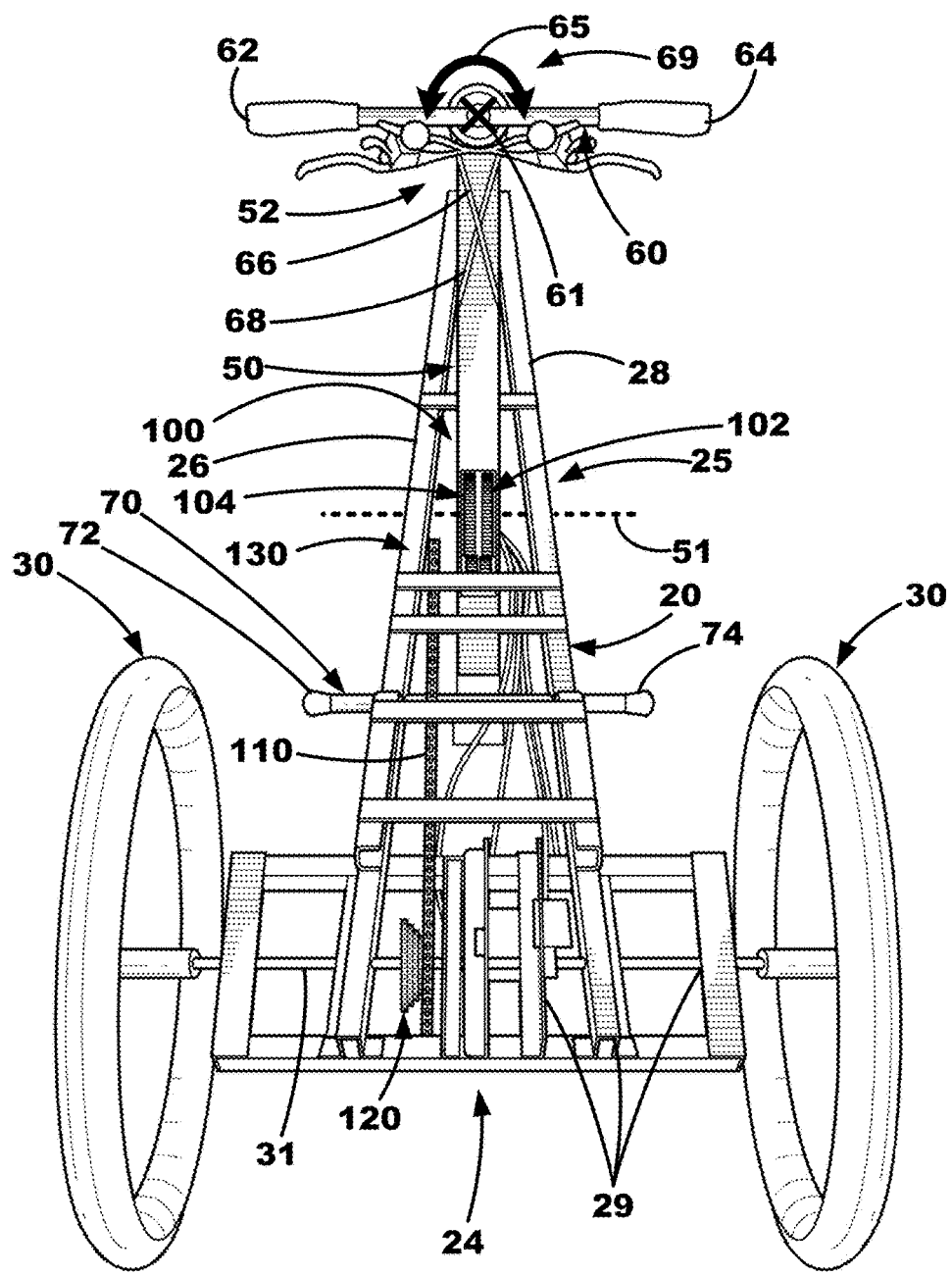
FIG. 5 is a top view of the human-powered vehicle of FIG. 1 at the end of a "recovery stroke."

The top view of the central region 25 of the human-powered vehicle depicted in FIG. 5 further illustrates the handle 60 being pivotably coupled to the drive member 50, and more specifically, the hands end region 52 of the drive member 50, to provide steering functionality to the human-powered vehicle 10. The handle 60 may be a part, or portion of exemplary steering apparatus 69 of the human-powered vehicle 10. The handle 60 may be pivotable about a steering handle axis 61 either clockwise or counterclockwise as indicated by the double-sided arrow 65 to turn the human-powered vehicle 10. For example, if the handle 60 is moved clockwise (e.g., the right end 64 of the handle 60 is moved towards the ground surface, etc.), the human-powered vehicle 10 may turn right. Conversely, for example, if the handle 60 is moved counter clockwise (e.g., the left end 62 of the handle 60 is moved towards the ground surface, etc.), the human-powered vehicle 10 may turn left.

Figure 6:
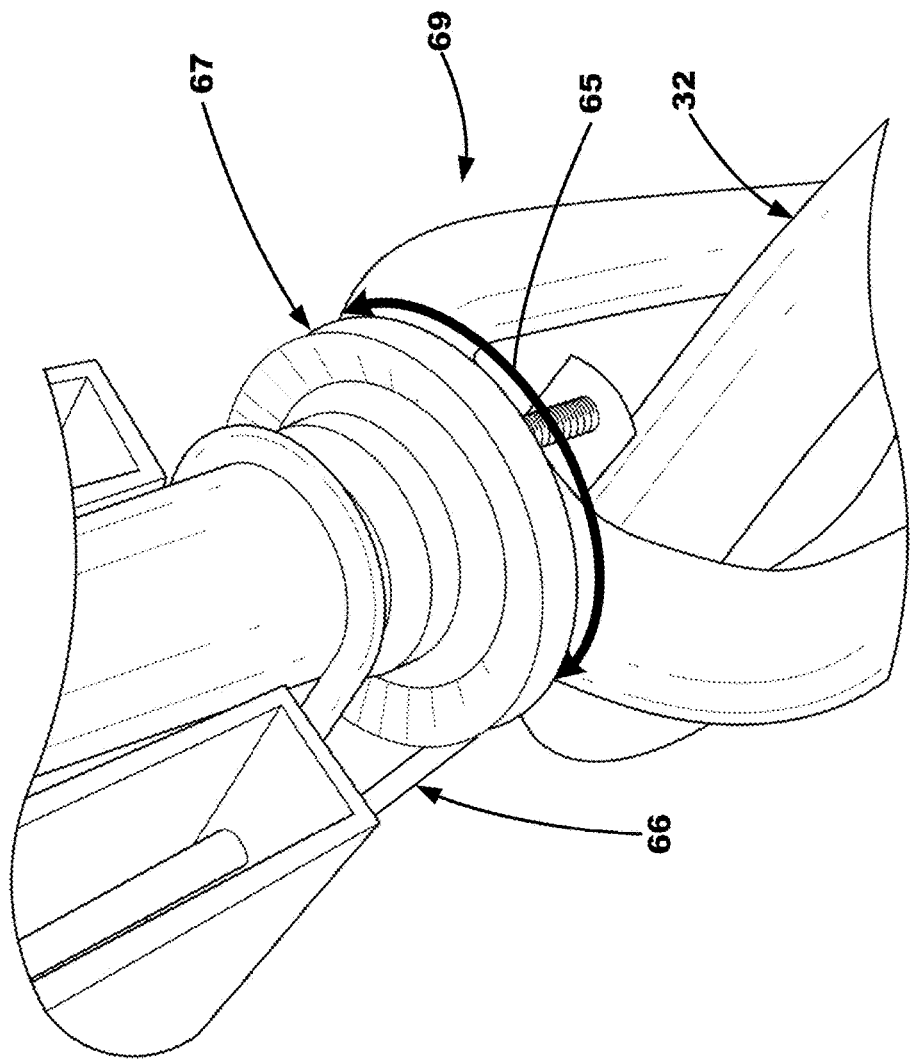
FIG. 6 is a front perspective view of a forward end region of the frame of the human-powered vehicle of FIG. 1 illustrating a fork element.

To perform this steering functionality, the handle 60 may be operably coupled to the fork element 23, which couples the front wheel 32 to the forward end region 22 of the frame 20, to steer the human-powered vehicle 10 through use of one or more cables. For example, as shown, a first cable 66 and a second cable 68 are coupled to a mount portion of the handle 60 such that movement of the handle 60 clockwise will pull the first cable 66, and conversely, movement of the handle 60 counter clockwise will pull the second cable 68. The first and second cables 66, 68 may be operably coupled to a steering pulley 67 that fixedly coupled to the fork element 23 as shown in FIG. 6. The "pulling" of the first cable 66 will turn the human-powered vehicle 10 right, and the "pulling" of the second cable 68 will turn the human-powered vehicle 10 left. In other words, the cables 66, 68 may be coupled to the steering pulley 67 fixedly coupled to the fork element 23 of the human-powered vehicle 10 to rotate the front wheel 32 about a turning axis, which may be substantially perpendicular to the ground surface 11. Further, the cables 66, 68 may be tensioned by tensioning springs to, e.g., bias the steering apparatus 69 is a neutral (e.g., neither left or right turning) position, take up slack when the driver member 50 is pivoted about the pivot axis 51, prevent the front wheel 32 from wobbling, etc.

Figure 7:
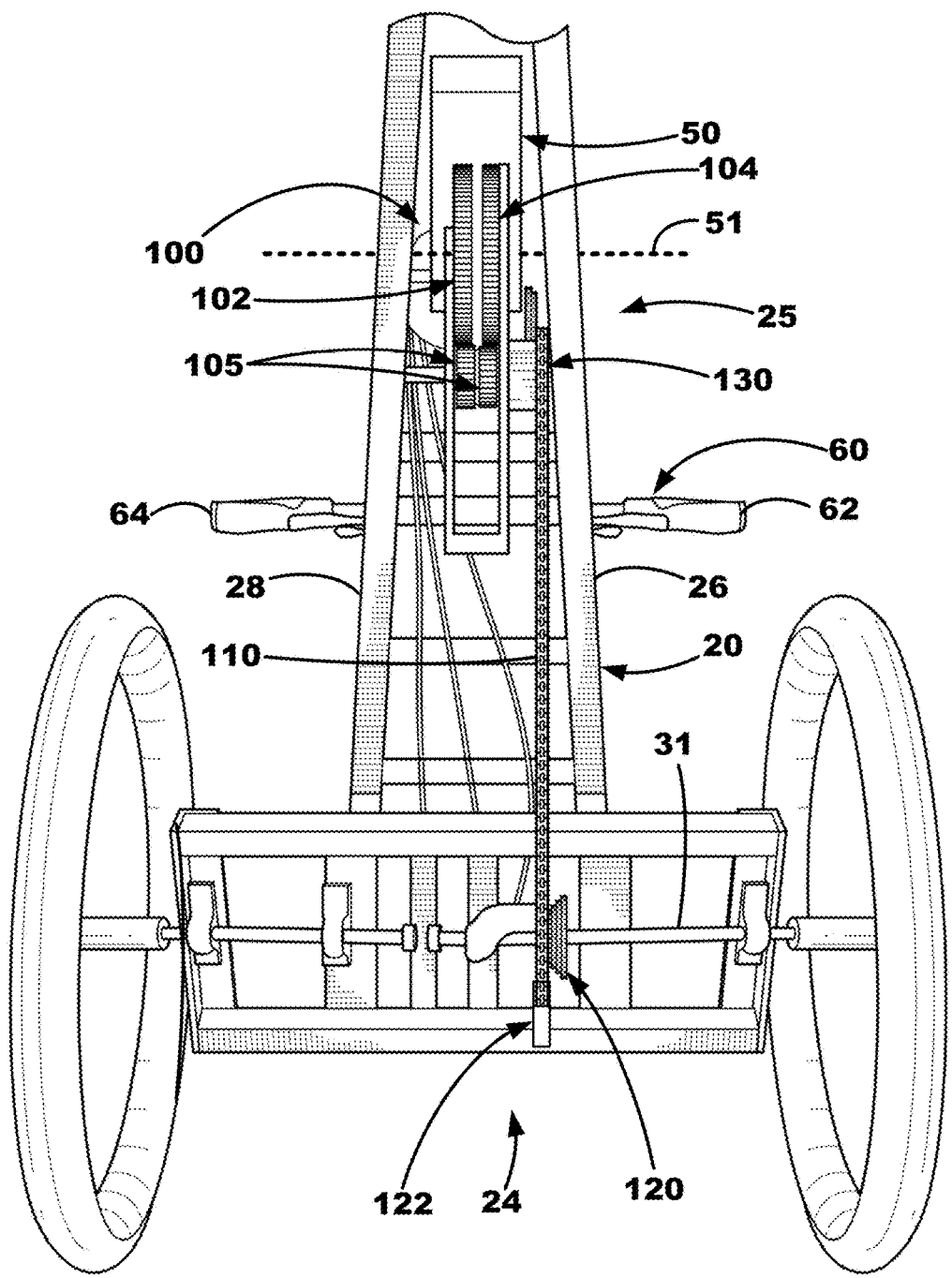
FIG. 7 is a bottom view of the human-powered vehicle of FIG. 1.

As described herein, the human-powered vehicle 10 further includes a transmission 100 that operably couples the drive member 50 to the rear wheels 30. The transmission 100 may include a chain 110 used to operably couple portions of the transmission 100 located near the central region 25 of the frame 20 to portions of the transmission 100 located near the rear region 24 of the frame 20 as shown in FIGS. 5-7. Although a chain 110 is used in this embodiment, it is to be understood that other operable coupling apparatus may be used to operably couple pivotal movement generated by the drive member 50 to one or more of the rear wheels 30. As shown in FIGS. 5 and 7, the rear end region 24 of the frame 20 includes a plurality rear frame elements 29, which are configured to support the seat 40 and to be coupled to the rear wheels 30 such that, e.g., the rear wheels 30 may rotate. More specifically, the rear wheels 30 may be fixedly coupled to a rear axle 31 that is rotatably coupled to the rear frame elements 29. A rear cassette, or sprocket cluster, 120 may be attached to the rear axle 31 such that movement of the rear cassette 120 in the forward rolling motion will, in turn, rotate one of the rear wheels 30 forward. In the embodiment depicted, each of the rear wheels 30 operates independently from each other. For example, one of the rear wheels 30 (e.g., the left rear wheel) may be operably coupled to the rear cassette 120 to be driven by the transmission 100 and the other rear wheel 30 (e.g., the right wheel) may spin, or rotate, freely. The rear cassette 120 may be coupled to the rear axle 31 using a "free-wheel" apparatus such that rotational movement of the rear wheels 30 that is faster than the rear cassette 120 or in an opposite rotational direction than the rear cassette 120 will not rotate the cassette 120 (to, e.g., allow a user to "coast" without operating the drive member 50 to generate power). As shown, the rear cassette 120 includes more than one sprocket of varying sizes to operably engage with the chain 110. The chain 110 may be moved from one sprocket to another of the rear cassette 120 through the use of a conventional cabled-operated rear derailleur 122 (labeled in FIGS. 5 and 7) to change "speeds" of the human-powered vehicle 10. The rear cassette 120 may be referred to as a "driven gear."

Figure 8:
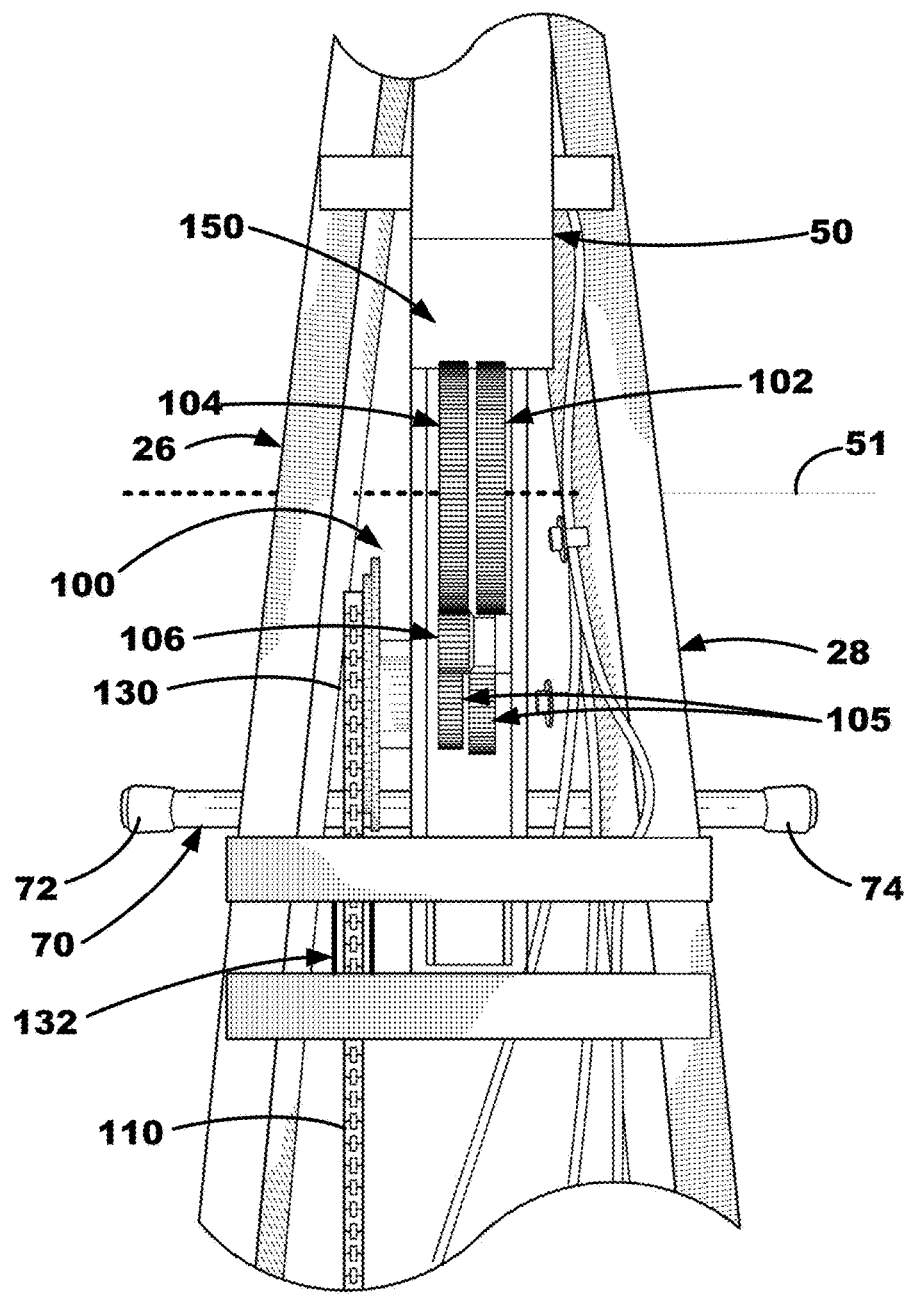
FIG. 8 is a top view of the central region and transmission of the human-powered vehicle of FIG. 1.
Figure 9:
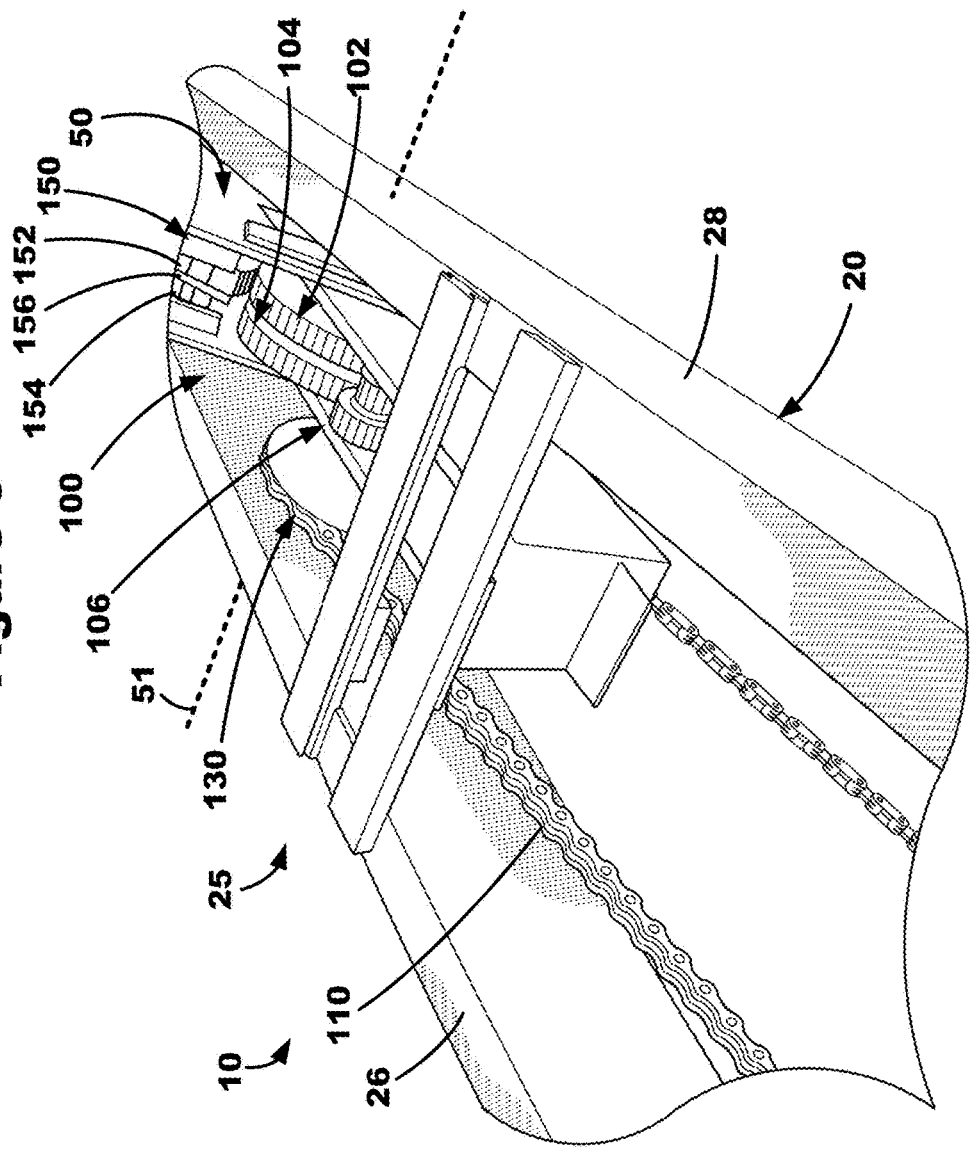
FIG. 9 is a top perspective view of the central region and transmission of the human-powered vehicle of FIG. 1.

The chain 110 may extend from the rear end region 24 of the frame 20 to the central region 25 to operably couple the rear cassette 120 to the remainder of the transmission 100 as shown in FIG. 5. More specifically, as shown in FIGS. 8-9, the chain 110 may be operably coupled to a forward cassette 130 that is fixedly coupled to the transmission 100. The forward cassette 130 may include a plurality of sprockets of varying sizes to operably engage with the chain 110, which may be moved from one sprocket to another of the forward cassette 130 through the use of a conventional cabled-operated front derailleur to change "speeds" of the human-powered vehicle 10.

Generally, the transmission 100 may include a plurality of gears of various sizes. The gears may include (e.g., be formed of) one or more materials such as, e.g., steel, aluminum, titanium, carbon fiber, fiberglass, and/or polymer material. In at least one embodiment, the width, or thickness, of the gears may be about 0.5 inches. As shown, the exemplary transmission 100 includes a first gear 102 and a second gear 104 to rotate, or pivot, about the drive member axis 51 as shown in FIGS. 5 and 7-12. The first and second gears 102, 104 may rotate, or pivot, on a drive axle 53 extending along the drive member axis 51. Depending on the direction of pivoting that the drive member 50 is moving, one of the first and second gears 102, 104 may be fixedly coupled to the drive member 50 so as to rotate with the drive member 50. In other words, one of the first and second gears 102, 104 may be engaged with the transmission 100 at a time depending, or in response, to the direction of pivotal motion of the drive member 50.

To perform this selective fixedly coupling of one of each of the first and second gears 102, 104 to the drive member 50, the transmission 100 may include locking apparatus 150 that will be further described herein. More specifically, for example, when the drive member 50 is pivoted about the drive member axis 51 in a first direction such as when the hands end region 52 is moved toward the rear end region 24 of the frame 20, the first gear 102 may be fixedly coupled to the drive member 50 using the locking apparatus 150 so as to rotate with drive member 50 and the second gear 104 may not be fixedly coupled to the drive member 50 so as to freely rotate. Conversely, when the drive member 50 is pivoted about the drive member axis 51 in a second direction (e.g., opposite the first direction) such as when the hands end region 52 is moved toward the forward end region 22 of the frame 20, the second gear 104 may be fixedly coupled to the drive member 50 using the locking apparatus 150 so as to rotate with the drive member 50 and the first gear 102 may not be fixedly coupled to the drive member 50 so as to freely rotate.

The first and second gears 102, 104 may be operably coupled to one or more drive gears 105 that is or are fixedly coupled to the front cassette 130. Since the second gear 104 may rotate in the opposite direction as the first gear 102 and may be used to rotate the drive gears 105 in the same rotational direction as the first gear 102, the transmission may further include a reversing gear 106 that operably couples the second gear 104 to the drive gears 105.

As described herein, the locking apparatus 150 may lock, or fixedly couple, one of the first and second gears 102, 104 to the drive member 50 depending on, or in response to, the direction that the drive member 50 is being pivoted or pivotally moved. Although it is to be understood that the locking apparatus 150 may include any one or more mechanisms to achieve such functionality (e.g., solenoids, etc.), the exemplary locking apparatus 150 depicted and described herein may include a set of the locking cams 152, 154 configured to be either engaged or disengaged with the first and second gears 102, 104 such that the first and second gears 102, 104 rotate with the motion of the driver member 50. In other words, the locking cams 152, 154 may lock the drive member 50 to one of the first and second gears 102, 104 at a time. More specifically, the transmission 100 may include a first locking cam 152 to engage the first gear 102 to fixedly couple the first gear 102 to the drive member 50 when the hands end region 52 of the drive member 50 is moved about the drive member axis 51 towards the rear end region 24 of the frame 20 and to disengage from the first gear 102 to release the first gear 102 from the drive member 50 (e.g., release from being fixedly coupled) when the hands end region 52 of the drive member 50 is moved about the drive member axis 51 towards the forward end region 22 of the frame 20. Further, the transmission 100 may include a second locking cam 154 to engage the second gear 104 to fixedly couple the second gear 104 to the drive member 50 when the hands end region 52 of the drive member 50 is moved about the drive member axis 51 towards the forward end region 22 of the frame 20 and to disengage from the second gear 104 to release the second gear 104 from the drive member 50 (e.g., release from being fixedly coupled) when the hands end region 52 of the drive member 50 is moved about the drive member axis 51 towards the rear end 24 region of the frame 20.

Figure 10:
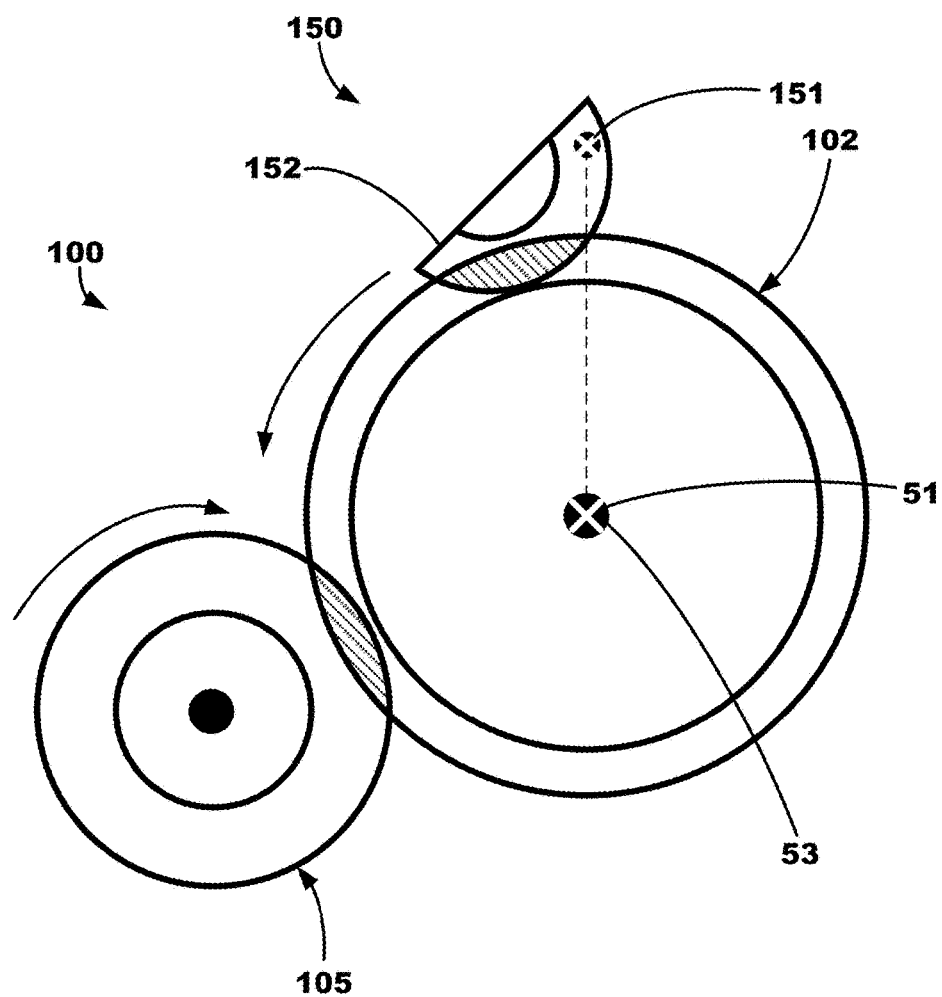
FIG. 10 is a diagrammatic plan view of the transmission of the human-powered vehicle of FIGS. 1-9 configured to drive a first gear and a drive gear.
Figure 11:
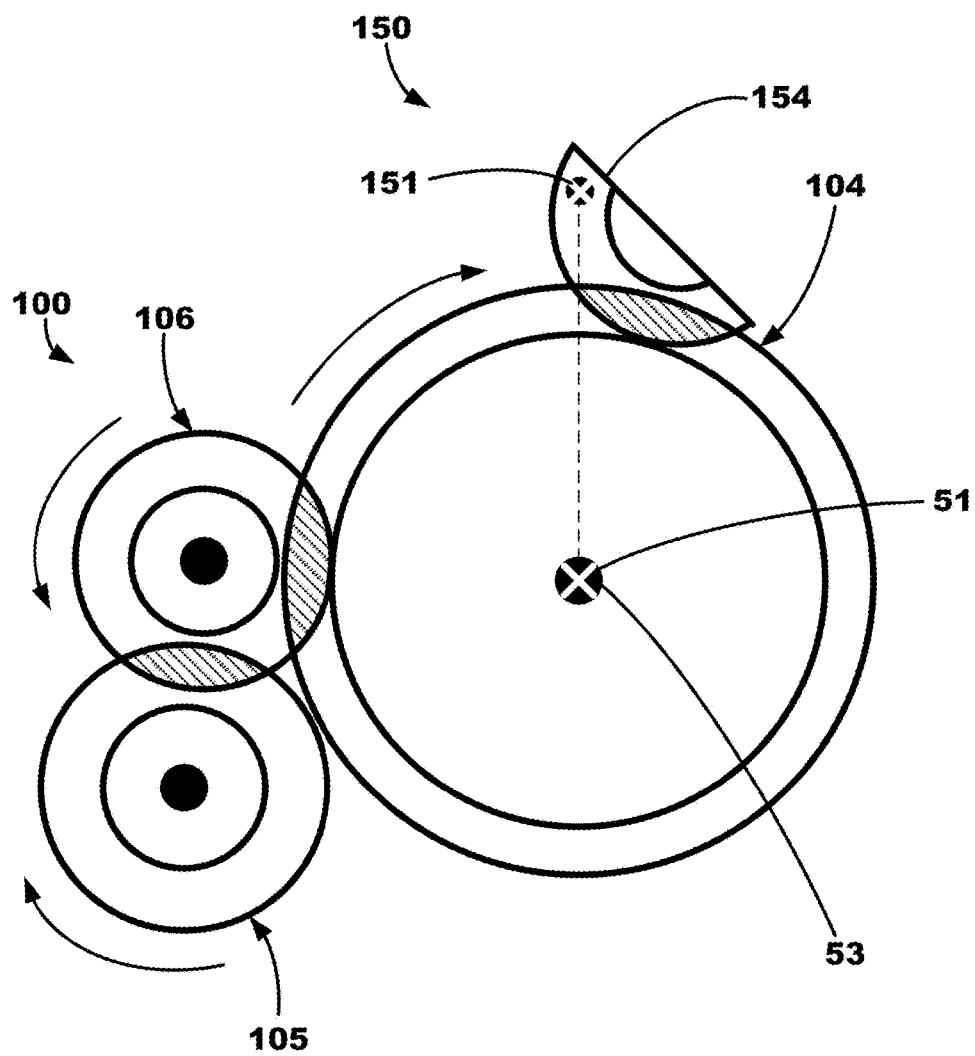
FIG. 11 is a diagrammatic plan view of the transmission of FIG. 10 configured to drive a second gear and a drive gear using a reversing gear.

Diagrammatic plan views of the transmission 100 are depicted in FIGS. 10-11, which illustrates the functionality of the transmission 100 including the locking cams 152, 154. As shown in FIGS. 10-11, the first locking cam 152 has engaged the first gear 102 such that first gear 102 is fixedly coupled to the drive member 50, and therefore, pivotal movement of the drive member 50 will rotate the first gear 102, which, in turn, rotates a drive gear 105. Each locking cam may include teeth that may mesh, or engage with, the teeth of the engaged gear. Here, the teeth of the first locking cam 152 may be meshed with, or engaged with, the teeth of the first gear 102 as shown in this example in FIG. 10. Additionally, as shown in FIG. 10, the second locking cam 154 is disengaged from the second gear 104 such that the pivotal movement of the drive member 50 does not move, or rotate, the second gear 104 along with the drive member 50 (e.g., the second gear 104, however, may move through movement of the other gears such as from the first gear 102 to a drive gear 105, which rotates a drive gear 105, which rotates the reversing gear 106, which to rotates the second gear 104 in the opposite direction as the first gear 102). More specifically, the teeth of the second locking cam 154 would not be meshed, or engaged with, the teeth of the second gear 104 as shown in this example in FIG. 10.

As shown in FIG. 11, the second locking cam 154 has engaged the second gear 104 such that second gear 104 is fixedly coupled to the drive member 50, and therefore, pivotal movement of the drive member 50 will rotate the second gear 104, which, in turn, rotates the reversing gear 106, and subsequently, a drive gear 105. More specifically, the teeth of the second locking cam 154 may be meshed with, or engaged with, the teeth of the second gear 104 as shown in this example in FIG. 11. Additionally, when the second locking cam 154 is engaged with the second gear 104, the first locking cam 152 is disengaged from the first gear 102 such that the pivotal movement of the drive member 50 does not move, or rotate, the first gear 102 along with the drive member 50 (e.g., the first gear 102, however, may move through movement of the other gears such as from the second gear 104 to the reversing gear 106, which rotates a drive gear 105, which to rotates the first gear 102 in the opposite direction as the second gear 104). More specifically, the teeth of the first locking cam 152 would not be meshed, or engaged with, the teeth of the second gear 102 as shown in this example in FIG. 11.

Figure 12A:
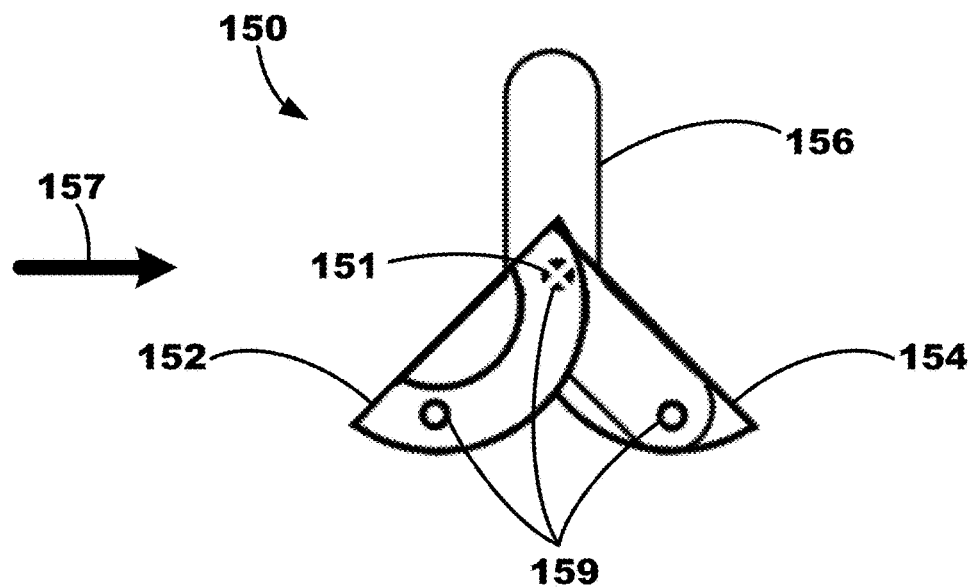
FIG. 12A is a side view of the locking apparatus of the transmission of FIG. 10.
Figure 12B:
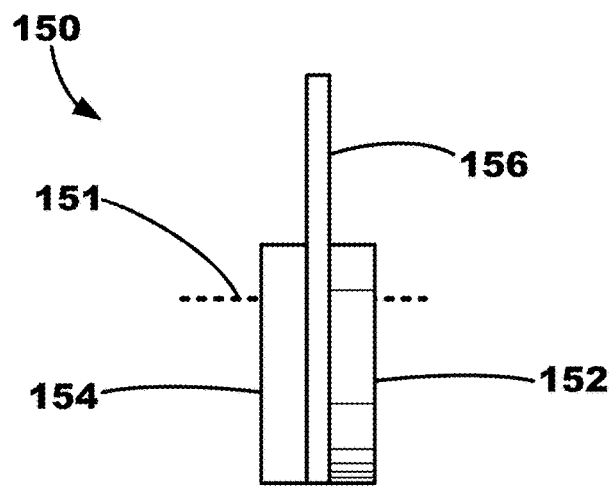
FIG. 12B is a front view of the locking apparatus of FIG. 12A when viewed as indicated by arrow 157.

The locking cams 152, 154 may be fixedly coupled to an intermediate, or pivot, member 156 thereby joining the locking cams 152, 154 such that they pivot, or move, together about a single pivot axis 151 to engage and disengage the first and second locking cams 154, 154 to and from the first and second gears 102, 104, respectively, based on, or in response to, the movement of the drive member 50. For example, fasteners (e.g., screws, bolts, nuts, etc.) 159 may fixedly couple the locking cams 152, 154 and the intermediate member 156 as shown in FIG. 12A. The intermediate member 156 may be described as a rigid plate fixedly connected the locking cams 152, 154 such that the locking cams 152, 154 move in unison as shown in FIG. 12B.

More specifically, the locking cams 152, 254 and the intermediate member 156 may pivot about the pivot axis 151 in response to motion of the drive member 50 so as to engage one, but not both, of the locking cams 152, 154 to the respective first and second gears 102, 104. The locking cams 152, 154 are specifically positioned about the intermediate member 156 to provide such functionality. Thus, when the drive member 50 is pivoted about the drive member axis 51 such that the hands end region 52 is being moved towards the rear end region 24 of the frame 20, the locking cams 152, 154 and the intermediate member 156 may pivot about the pivot axis 151 to place, or position, the first locking cam 152 in engagement with the first gear 102 (such that the first gear 102 rotates, or pivots, with the drive member 50) and to place, or position, the second locking cam 154 not in engagement with the second gear 104. Conversely, when the drive member 50 is pivoted about the drive member axis 51 such that the hands end region 52 is being moved towards the forward end region 22 of the frame 20, the locking cams 152, 154 and the intermediate member 156 may pivot about the pivot axis 151 to place, or position, the second locking cam 154 in engagement with the second gear 104 (such that the second gear 104 rotates, or pivots, with the drive member 50) and to place, or position, the first locking cam 152 not in engagement with the first gear 102.

The locking cams 152, 154 may be described as being fixedly coupled together and positioned apart from one another to operate in unison when pivoting about the pivot axis 151 via the intermediate member 156. For example, the locking cams 152, 154 are locked together so that upon reversal of the drive member 50, the locking cam that is engaged, or locked, with one of the first and second gears 102, 104 disengages from the gear, and the intermediate member 156 and the locking cams 152, 154 rotates, or pivots about the pivot axis 151 such that the other locking cam may engage with the other gear.

In sum, the exemplary transmission 100 may generally include a rear cassette 120, or driven gear, fixedly coupled (e.g., any include a rear derailleur system) to the at least one rear wheel 30, at least one drive gear 105 (such as, e.g., two drive gears) operably coupled (e.g., through a chain, one or more sprockets, etc.) to the rear cassette 120 to rotate the rear axle 31 in response to the drive gear 105 being rotated, a first gear 102 operably coupled to the drive gear 105 when the hands end region 52 of the drive member 50 is moved about the drive member axis 51 towards the rear end region 24 of the frame 20, and a second gear 104 operably coupled to the drive gear 105 when the hands end region 52 of the drive member 50 is moved about the drive member axis 51 towards the forward end region 22 of the frame 20. The exemplary transmission 100 may further include a reversing gear 106 operably coupling the second gear 104 to the drive gear 105 when the hands end region 52 of the drive member 50 is moved about the drive member axis 51 towards the forward end region 22 of the frame 20 to rotate the drive gear 105 in the same direction as rotated by the first gear 102 when the hands end region 52 of the drive member 50 is moved about the drive member axis 51 towards the rear end region 24 of the frame 20.

The exemplary human-powered vehicle described herein may be described as providing a unique propulsion system that combines upper body and arm power linked to foot pedals through a lever in such a way as to provide positive movement to the human-powered vehicle (e.g., a tricycle) on both the forward and return stroke to allow nearly continuous forward energy input. Linking of the energy available through the arms and upper body with that provided by the legs and feet may allow efficient use of body energy, analogous to that obtained in sculling. The exemplary systems and apparatus of the human-powered vehicle may incorporate a conventional fixed seat, and thereby, may be described as being able to maximize energy input to the propulsion system. Further, the back-and-forth movement of the lever arm may be translated into continuous positive rotation of the conventional bicycle drive sprocket through a system of hub gears that are alternately engaged on the forward power stroke of the lever arm and then engaged on the return stroke through a reversing gear to provide continuous drive to the system. The locking system described herein may use linked half gears mounted on an eccentric shaft that simultaneous disengage, and engage the primary drive gears at the end of the power stroke and recovery stroke to provide the continuous rotary motion to the drive sprocket.

This disclosure has been provided with reference to illustrative embodiments and is not meant to be construed in a limiting sense. One skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed:

1. A human-powered vehicle for traversing a ground surface comprising:
    a frame extending from a forward end region to a rear end region along a frame axis;
    at least one front wheel rotatably coupled to the forward end region of the frame member to roll over the ground surface and to support the frame member above the ground surface;
    at least one rear wheel rotatably coupled to the rear end region of the frame member to roll over the ground surface and to support the frame member above the ground surface;
    a seat coupled to the frame portion to receive a human's posterior;
    a drive member extending from a hands end region to be engaged by the human's hands to a feet end region to be engaged by the human's feet, wherein the drive member is pivotably coupled to the frame member between the forward end region and the seat about a drive member axis perpendicular to the frame axis, wherein the drive member is operably coupled to the at least one rear wheel to rotate the at least one rear wheel in response to motion of the drive member about the drive member axis in the clockwise direction, wherein the drive member is operably coupled to the at least one rear wheel to rotate the at least one rear wheel in response to motion of the drive member about the drive member axis in the counterclockwise direction, wherein the drive member axis is located closer to the ground surface than the seat, and
    a transmission comprising:
        at least one drive gear operably coupled to the at least one rear wheel to rotate to the at least one rear wheel in response to the at least one drive gear being rotated;
        a first gear operably coupled to the at least one drive gear when the hands end region of the drive member is moved about the drive member axis towards the rear end region of the frame member;
        a second gear operably coupled to the at least one drive gear when the hands end region of the drive member is moved about the drive member axis towards the forward end region of the frame member;
        a drive axle fixedly coupled to the drive member and rotatably coupling the drive member to the frame member about the drive member axis, wherein the first and second gears are rotatably coupled to the drive axle;
        a first locking cam to engage the first gear to fixedly couple the first gear to the drive axle when the hands end region of the drive member is moved about the drive member axis towards the rear end region of the frame member and to disengage from the first gear to release the first gear from the drive axle when the hands end region of the drive member is moved about the drive member axis towards the forward end region of the frame member; and
        a second locking cam to engage the second gear to fixedly couple the second gear to the drive axle when the hands end region of the drive member is moved about the drive member axis towards the forward end region of the frame member and to disengage from the second gear to release the second gear from the drive axle when the hands end region of the drive member is moved about the drive member axis towards the rear end region of the frame member.

2. The human-powered vehicle of claim 1 further comprising a handle member extending from a left end region to a right end region pivotably coupled to the hands end region of the drive member about a steering axis, wherein the handle member is operably coupled to the at least one front wheel to steer the human-powered vehicle, wherein the handle member is configured to be engaged by the human's hands to be pivotable by the human about the steering axis to steer the human-powered vehicle and to reciprocally move the drive member about the drive member axis to drive the rotation of the at least one rear wheel.

3. The human-powered vehicle of claim 2, wherein the at least one front wheel is operably coupled to the handle member via one or more cables to pivot the at least one front wheel about a turning axis substantially perpendicular to the ground surface.

4. The human-powered vehicle of claim 1, wherein the transmission further comprises a chain operably coupling the at least one drive gear to the at least one rear wheel.

5. The human-powered vehicle of claim 1, wherein the transmission further comprises a reversing gear operably coupling the second gear to the at least one drive gear when the hands end region of the drive member is moved about the drive member axis towards the forward end region of the frame member to rotate the at least one drive gear in the same direction as rotated by the first gear when the hands end region of the drive member is moved about the drive member axis towards the rear end region of the frame member.

6. The human-powered vehicle of claim 1, wherein the transmission further comprises an intermediate member pivotably coupled to the drive member about a pivot axis and fixedly coupled to each of the first and second locking cams to pivot about the pivot axis to engage and disengage the first and second locking cams to and from the first and second gears, respectively.

7. The human-powered vehicle of claim 1, wherein the transmission is positioned proximate the drive member axis.

8. The human-powered vehicle of claim 1, wherein the at least one front wheel is a single front wheel.

9. The human-powered vehicle of claim 1, wherein the at least one rear wheel is two rear wheels.

10. The human-powered vehicle of claim 1 further comprising a feet member extending from a left end region to a right end region fixedly coupled to the feet end region of the drive member to be engaged by the human's feet to reciprocally move the drive member about the drive member axis.

11. The human-powered vehicle of claim 1, wherein the feet end region is positioned closer to the ground surface than the seat throughout reciprocal motion of the drive member.

12. A human-powered vehicle for traversing a ground surface comprising:
- a frame extending from a forward end region to a rear end region along a frame axis;
- at least one front wheel rotatably coupled to the forward end region of the frame member to roll over the ground surface and to support the frame member above the ground surface;
- at least one rear wheel rotatably coupled to the rear end region of the frame member to roll over the ground surface and to support the frame member above the ground surface;
- a drive member extending from a hands end region to be engaged by the human's hands to a feet end region to be engaged by the human's feet, wherein the drive member is pivotably coupled to the frame member between the forward end region and the rear end region about a drive member axis perpendicular to the frame axis, wherein the drive member is operably coupled to the at least one rear wheel to rotate the at least one rear wheel in response to reciprocal motion of the drive member about the drive member axis in both clockwise and counterclockwise directions; and
- a transmission to operably couple the drive member to the at least one rear wheel, wherein the transmission comprises:
  - at least one drive gear operably coupled to the at least one rear wheel to rotate to the at least one rear wheel in response to the at least one drive gear being rotated;
  - a first gear operably meshable to the at least one drive gear when the hands end region of the drive member is moved about the drive member axis towards the rear end region of the frame member; and
  - a second gear operably meshable to the at least one drive gear when the hands end region of the drive member is moved about the drive member axis towards the forward end region of the frame member.

13. The human-powered vehicle of claim 12, wherein the transmission further comprises a chain operably coupling the at least one drive gear to the at least one rear wheel.

14. The human-powered vehicle of claim 12, wherein the transmission further comprises a reversing gear operably meshing the second gear to the at least one drive gear when the hands end region of the drive member is moved about the drive member axis towards the forward end region of the frame member to rotate the at least one drive gear in the same direction as rotated by the first gear when the hands end region of the drive member is moved about the drive member axis towards the rear end region of the frame member.

15. The human-powered vehicle of claim 12, wherein the transmission further comprises:
- a drive axle fixedly coupled to the drive member and rotatably coupling the drive member to the frame member about the drive member axis, wherein the first and second gears are rotatably coupled to the drive axle;
- a first locking cam to engage the first gear to fixedly couple the first gear to the drive axle when the hands end region of the drive member is moved about the drive member axis towards the rear end region of the frame member and to disengage from the first gear to release the first gear from the drive axle when the hands end region of the drive member is moved about the drive member axis towards the forward end region of the frame member; and
- a second locking cam to engage the second gear to fixedly couple the second gear to the drive axle when the hands end region of the drive member is moved about the drive member axis towards the forward end region of the frame member and to disengage from the second gear to release the second gear from the drive axle when the hands end region of the drive member is moved about the drive member axis towards the rear end region of the frame member.

16. The human-powered vehicle of claim 15, wherein the transmission further comprises an intermediate member pivotably coupled to the drive member about a pivot axis and fixedly coupled to each of the first and second locking cams to pivot about the pivot axis to engage and disengage the first and second locking cams to and from the first and second gears, respectively.

17. A human-powered vehicle for traversing a ground surface comprising:
- a frame extending from a forward end region to a rear end region along a frame axis;
- at least one front wheel rotatably coupled to the forward end region of the frame member to roll over the ground surface and to support the frame member above the ground surface;
- at least one rear wheel rotatably coupled to the rear end region of the frame member to roll over the ground surface and to support the frame member above the ground surface;
- a drive member extending from a hands end region to be engaged by the human's hands to a feet end region to be engaged by the human's feet, wherein the drive member is pivotably coupled to the frame member between the forward end region and the rear end region about a drive member axis perpendicular to the frame axis, wherein the drive member is operably coupled to the at least one rear wheel to rotate the at least one rear wheel in response to reciprocal motion of the drive member about the drive member axis in both clockwise and counterclockwise directions; and
- a transmission to operably couple the drive member to the at least one rear wheel, wherein the transmission comprises:

at least one drive gear operably coupled to the at least one rear wheel to rotate to the at least one rear wheel in response to the at least one drive gear being rotated;
a first gear operably coupled to the at least one drive gear when the hands end region of the drive member is moved about the drive member axis towards the rear end region of the frame member;
a second gear operably coupled to the at least one drive gear when the hands end region of the drive member is moved about the drive member axis towards the forward end region of the frame member; and
a reversing gear operably coupling the second gear to the at least one drive gear when the hands end region of the drive member is moved about the drive member axis towards the forward end region of the frame member to rotate the at least one drive gear in the same direction as rotated by the first gear when the hands end region of the drive member is moved about the drive member axis towards the rear end region of the frame member.

18. The human-powered vehicle of claim 17, wherein the transmission further comprises a chain operably coupling the at least one drive gear to the at least one rear wheel.

19. The human-powered vehicle of claim 17, wherein the transmission further comprises:
a drive axle fixedly coupled to the drive member and rotatably coupling the drive member to the frame member about the drive member axis, wherein the first and second gears are rotatably coupled to the drive axle;
a first locking cam to engage the first gear to fixedly couple the first gear to the drive axle when the hands end region of the drive member is moved about the drive member axis towards the rear end region of the frame member and to disengage from the first gear to release the first gear from the drive axle when the hands end region of the drive member is moved about the drive member axis towards the forward end region of the frame member; and
a second locking cam to engage the second gear to fixedly couple the second gear to the drive axle when the hands end region of the drive member is moved about the drive member axis towards the forward end region of the frame member and to disengage from the second gear to release the second gear from the drive axle when the hands end region of the drive member is moved about the drive member axis towards the rear end region of the frame member.

20. The human-powered vehicle of claim 19, wherein the transmission further comprises an intermediate member pivotably coupled to the drive member about a pivot axis and fixedly coupled to each of the first and second locking cams to pivot about the pivot axis to engage and disengage the first and second locking cams to and from the first and second gears, respectively.

21. The human-powered vehicle of claim 17 further comprising a handle member extending from a left end region to a right end region pivotably coupled to the hands end region of the drive member about a steering axis, wherein the handle member is operably coupled to the at least one front wheel to steer the human-powered vehicle, wherein the handle member is configured to be engaged by the human's hands to be pivotable by the human about the steering axis to steer the human-powered vehicle and to reciprocally move the drive member about the drive member axis to drive the rotation of the at least one rear wheel.

22. The human-powered vehicle of claim 21, wherein the at least one front wheel is operably coupled to the handle member via one or more cables to pivot the at least one front wheel about a turning axis substantially perpendicular to the ground surface.

23. The human-powered vehicle of claim 17, wherein the transmission is positioned proximate the drive member axis.

24. The human-powered vehicle of claim 17, wherein the at least one front wheel is a single front wheel.

25. The human-powered vehicle of claim 17 further comprising a feet member extending from a left end region to a right end region fixedly coupled to the feet end region of the drive member to be engaged by the human's feet to reciprocally move the drive member about the drive member axis.

26. The human-powered vehicle of claim 25 further comprising a seat coupled to the frame portion to receive a human's posterior, wherein the feet end region is positioned closer to the ground surface than the seat throughout reciprocal motion of the drive member.

27. A human-powered vehicle for traversing a ground surface comprising:
a frame extending from a forward end region to a rear end region along a frame axis;
at least one front wheel rotatably coupled to the forward end region of the frame member to roll over the ground surface and to support the frame member above the ground surface;
at least one rear wheel rotatably coupled to the rear end region of the frame member to roll over the ground surface and to support the frame member above the ground surface;
a drive member extending from a hands end region to be engaged by the human's hands to a feet end region to be engaged by the human's feet, wherein the drive member is pivotably coupled to the frame member between the forward end region and the rear end region about a drive member axis perpendicular to the frame axis, wherein the drive member is operably coupled to the at least one rear wheel to rotate the at least one rear wheel in response to reciprocal motion of the drive member about the drive member axis in both clockwise and counterclockwise directions; and
a transmission to operably couple the drive member to the at least one rear wheel, wherein the transmission comprises:
at least one drive gear operably coupled to the at least one rear wheel to rotate to the at least one rear wheel in response to the at least one drive gear being rotated;
a first gear operably coupled to the at least one drive gear when the hands end region of the drive member is moved about the drive member axis towards the rear end region of the frame member;
a second gear operably coupled to the at least one drive gear when the hands end region of the drive member is moved about the drive member axis towards the forward end region of the frame member;
a drive axle fixedly coupled to the drive member and rotatably coupling the drive member to the frame member about the drive member axis, wherein the first and second gears are rotatably coupled to the drive axle;
a first locking cam to engage the first gear to fixedly couple the first gear to the drive axle when the hands end region of the drive member is moved about the drive member axis towards the rear end region of the frame member and to disengage from the first gear to release the first gear from the drive axle when the hands end region of the drive member is moved about the drive member axis towards the forward end region of the frame member; and a second locking cam to engage the second gear to fixedly couple the second gear to the drive axle when the hands end region of the drive member is moved about the drive member axis towards the forward end region of the frame member and to disengage from the second gear to release the second gear from the drive axle when the hands end region of the drive member is moved about the drive member axis towards the rear end region of the frame member.

28. The human-powered vehicle of claim 27, wherein the transmission further comprises a chain operably coupling the at least one drive gear to the at least one rear wheel.

29. The human-powered vehicle of claim 27, wherein the transmission further comprises an intermediate member pivotably coupled to the drive member about a pivot axis and fixedly coupled to each of the first and second locking cams to pivot about the pivot axis to engage and disengage the first and second locking cams to and from the first and second gears, respectively.

30. The human-powered vehicle of claim 27 further comprising a handle member extending from a left end region to a right end region pivotably coupled to the hands end region of the drive member about a steering axis, wherein the handle member is operably coupled to the at least one front wheel to steer the human-powered vehicle, wherein the handle member is configured to be engaged by the human's hands to be pivotable by the human about the steering axis to steer the human-powered vehicle and to reciprocally move the drive member about the drive member axis to drive the rotation of the at least one rear wheel.

31. The human-powered vehicle of claim 30, wherein the at least one front wheel is operably coupled to the handle member via one or more cables to pivot the at least one front wheel about a turning axis substantially perpendicular to the ground surface.

32. The human-powered vehicle of claim 27, wherein the transmission is positioned proximate the drive member axis.

33. The human-powered vehicle of claim 27, wherein the at least one front wheel is a single front wheel.

34. The human-powered vehicle of claim 27 further comprising a feet member extending from a left end region to a right end region fixedly coupled to the feet end region of the drive member to be engaged by the human's feet to reciprocally move the drive member about the drive member axis.

35. The human-powered vehicle of claim 34 further comprising a seat coupled to the frame portion to receive a human's posterior, wherein the feet end region is positioned closer to the ground surface than the seat throughout reciprocal motion of the drive member.

* * * * *

UNITED STATES PATENT AND TRADEMARK OFFICE
CERTIFICATE OF CORRECTION

PATENT NO. : 9,994,283 B1  
APPLICATION NO. : 15/380087  
DATED : June 12, 2018  
INVENTOR(S) : Rodney L. Bleifuss Page 1 of 1

It is certified that error appears in the above-identified patent and that said Letters Patent is hereby corrected as shown below:

On the Title Page

In the last line of the (*) Notice section, delete the second occurrence of "days.".

In the Claims

In Column 14, Line 5, Claim 1, delete "to rotate to the" and replace with --to rotate the--.

In Column 15, Line 50, Claim 12, delete "to rotate to the" and replace with --to rotate the--.

In Column 17, Line 2, Claim 17, delete "to rotate to the" and replace with --to rotate the--.

In Column 18, Line 48, Claim 27, delete "to rotate to the" and replace with --to rotate the--.

Signed and Sealed this  
Second Day of October, 2018

Andrei Iancu  
*Director of the United States Patent and Trademark Office*